United States Patent [19]

Kates

[11] Patent Number: 4,587,702
[45] Date of Patent: May 13, 1986

[54] METHOD FOR CONVERTING A STEEL SLITTER INTO A FOUR HIGH COLD REDUCTION MILL

[76] Inventor: Roger M. Kates, 1306 Blue Spring Rd., Princeton, N.J. 08540

[21] Appl. No.: 616,824

[22] Filed: Jun. 4, 1984

[51] Int. Cl.$^4$ .............................................. B23P 17/00
[52] U.S. Cl. .................................... 29/401.1; 72/203; 72/238
[58] Field of Search ................. 29/401.1, 560; 72/203, 72/204, 238, 242, 241

[56] References Cited

U.S. PATENT DOCUMENTS

| | | |
|---|---|---|
| 1,561,803 | 11/1925 | Smith . |
| 3,171,304 | 3/1965 | Sims et al. ............................ 72/238 |
| 3,566,515 | 3/1971 | Hultgren et al. . |
| 3,875,655 | 4/1975 | Gerlach . |
| 4,162,626 | 7/1979 | Decima et al. ....................... 72/238 |
| 4,187,710 | 2/1980 | Stikeleather . |
| 4,470,283 | 9/1984 | Schnyder ......................... 72/238 X |
| 4,494,395 | 1/1985 | Brettbacher et al. ................. 72/203 |
| 4,499,748 | 2/1985 | Nihei et al. ........................... 72/238 |

Primary Examiner—Howard N. Goldberg
Assistant Examiner—Carl J. Arbes
Attorney, Agent, or Firm—Richard C. Woodbridge

[57] ABSTRACT

A method and apparatus are employed to convert a conventional slitter into a four high cold reduction mill. According to the preferred embodiment the blades of the slitter are removed and the upper and lower arbors are separated to place a pair of work rolls in between. A left and right side support unit is mounted on the upper and lower arbors. The left and right support units each carry a pair of upper and lower arbor housings for attachment to the upper and lower arbor shafts and a second pair of housings for mounting the upper and lower work rolls between the upper and lower arbors. Packing sleeves are fitted on the upper and lower arbor shafts so that the converted upper and lower arbors act as back-up rolls for the upper and lower work rolls. According to an alternative embodiment of the invention, the entire slitter head including its inboard and outboard housing is replaced by an entirely new four high head including its own inboard and outboard housing. The advantage of the present invention is that it is possible to perform slitting and cold rolling on essentially the same machine. The device is especially useful where large forces and large reductions in size are not necessary.

2 Claims, 20 Drawing Figures

METHOD FOR CONVERTING A STEEL SLITTER INTO A FOUR HIGH COLD REDUCTION MILL

BACKGROUND OF THE INVENTION

1. Field of the Invention

The present invention relates to a method and apparatus for converting a slitter into a four high cold reduction mill.

2. Description of the Prior Art

In general arbor slitters and multi-roll cold reduction machines are known to those of ordinary skill in the art. A useful description of slitting equipment can be found in the book entitled "COIL SLITTING" by John W. Rogers and William H. Millan published in 1972 by the Corinthian Press, Cleveland, Ohio. Similarly, an exhaustive description of various types of multi-roll mills can be found in the book entitled "COLD ROLLING OF STEEL" by William L. Roberts published in 1978 by Marcel Decker, Inc. of New York City. Various other descriptions of the methods and apparatuses used for the splitting and milling of steel are also available to the general public.

Many industries, such as the automobile industry, use substantial quantities of cold rolled steel. Unfortunately, the energy consumed in producing cold rolled steel is high because it takes a lot of work to cold reduce steel from one dimension to another. Accordingly, the cost of cold rolled steel is relatively high. In the last few years that cost has increased substantially going from approximately 8 cents a pound in 1972 to about 25 cents a pound in 1984. Therefore, there is a need to find ways to minimize the cost of producing cold rolled steel. There are certain markets where expensive cold rolled steel could be replaced with less expensive hot rolled steel. For example, in the automobile industry it would be possible to replace cold rolled steel in certain non-exposed areas where surface finish and bends are not important, but where tolerance is.

Part of the cost of producing cold rolled steel is a result of the cost of the equipment itself. A typical steel converting operation would include separate slitting and cold reduction equipment. The cost of the additional cold reduction equipment can be prohibitive for a small steel converting operation. The cost factor becomes even more critical in the context of competition from foreign imports. Accordingly, a means was sought to reduce the cost of producing cold rolled steel, especially steels where relatively small amounts of reduction were required.

There are a few references in the patent literature of possible relevance to the issue of converting one metal working device into another. For example, U.S. Pat. No. 3,875,655 entitled "Convertible Metal Working Machine" generally discusses a means for converting a movable shear machine into a device for performing other metal working operations. U.S. Pat. No. 4,187,710 discloses a method for rolling and slitting simultaneously though it does not appear to address the question of converting a slitter apparatus into a rolling mill.

U.S. Pat. No. 3,566,515 is of general interest in that it discloses a roll grinding machine having a structure of possible relevance which includes a detachable feature. A number of prior art references, too numerous to list, discuss various techniques for removing housings and-/or bearings for the purpose of replacing work rollers with fresh rollers.

Also, U.S. Pat. No. 1,561,803 is of general interest in that it discloses a strip straightening attachment for having a structure of possible relevance for using with rotary shears.

Insofar as understood, none of the prior art references known to the inventor either taken individually, or in combination, suggest the novel method and apparatus disclosed herein for converting an arbor slitter into a four high cold rolled mill.

SUMMARY OF THE INVENTION

Briefly described the invention comprises a method and apparatus for converting a slitter having arbors into a four high cold reduction mill. According to the preferred embodiment of the invention, the slitter blades of the slitter's arbor are first removed. A left and right support unit are then mounted across the upper and lower arbors. The left and right support unit each comprise a pair of upper and lower housings for mounting on the upper and lower arbors and a pair of upper and lower work roll housings for supporting the upper and lower work rolls. The upper and lower arbor housings include bearings and a key way for engagement with the key on the upper and lower arbor shafts respectively. The work roll housings include bearings and are adapted to float on the rods that connect the upper and lower arbor housings. An upper and a lower work roll are mounted in said work roll housing. The converted slitter has thus become a four high cold reduction machine in which the upper and lower arbors act as the backup rolls to the intermediate pair of work rolls. The converted machine employs the original drive of the slitter. Additional power to pull the steel through the four high head is provided in the take-up machine motor. The converted apparatus is especially suited for one pass cold rolling operations in which relatively small reductions in the range of 8% or less are desired.

According to an alternative embodiment, the work rolls may be slightly crowned in order to improve the reducing action. According to that embodiment, the packing on the arbors assumes a complimentary concave shape so as to uniformly back up the crowned work rolls.

According to another alternative embodiment of the invention the entire slitter head of a prior art slitter machine is removed and replaced with an entirely new cold reduction head unit. A typical slitter head would include a pair of slitter rolls supported by an inboard and outboard housing. The four high cold reduction head would include an upper and a lower back up roll plus an upper and a lower work roll supported by their own inboard and outboard housing. The slitter head would be adapted to connect directly to the drive train that previously connected to the inboard housing of the removed slitter head. This alternative embodiment would be simpler to employ than the preferred embodiment, however, it would be somewhat more expensive to use because it requires additional back up rolls.

These and other features of the invention will be more fully appreciated by reference to the following drawings and detailed description of the invention.

DETAILED DESCRIPTION OF THE PREFERRED EMBODIMENT

During the course of this description like numbers will be used to identify like elements that appear in the different figures illustrating the invention.

Figure 1:
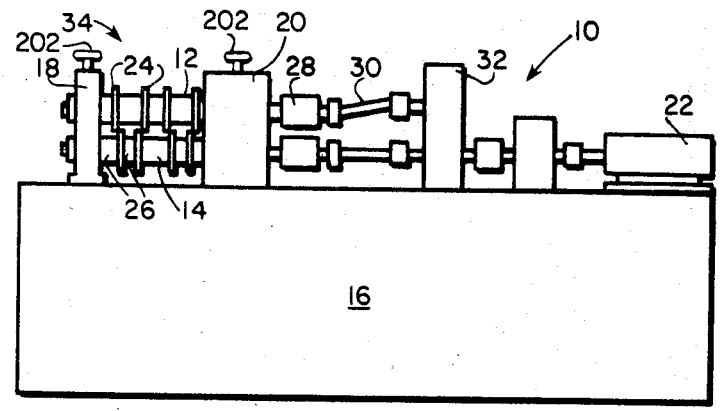
FIG. 1 is a front elevational view of an unconverted prior art slitter.

FIGS. 1 through 4 illustrate different aspects of a prior art slitter. As shown in FIG. 1 a typical prior art slitter 10 includes an upper arbor 12 and a lower arbor 14 supported by a left outboard arbor housing 18 and a right inboard arbor housing 20 mounted on a machine base 16. A drive motor 22, also mounted on a base 16 provides power through pinion stand 32, universal drives 30 and over-running clutches 28 to arbors 12 and 14. Arbors 12 and 14 include a plurality of slitter blades 24 separated by packing sleeve elements 26. Outboard and inboard housings 18 and 20 respectively in combination with upper and lower arbors 12 and 14 comprise an entire slitter head 34.

Figure 2:
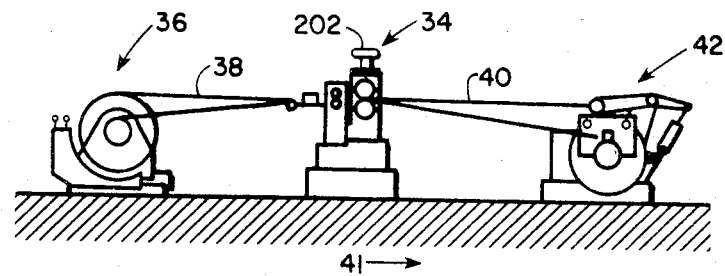
FIG. 2 is a side elevational view of a prior art slitter facility.

A typical prior art coil slitter operation is illustrated in FIG. 2. A pay off machine 36 delivers sheet steel 38 to the slitter head 34 which slits the steel 38 into coil strips 40 which are pulled through and rolled up by take up machine 42. The sheet steel travels in the direction of arrow 41 during the process.

Figure 3:
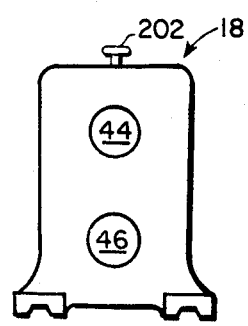
FIG. 3 is a side elevational view of the outboard housing of the prior art slitter unit of FIG. 1.
Figure 4:
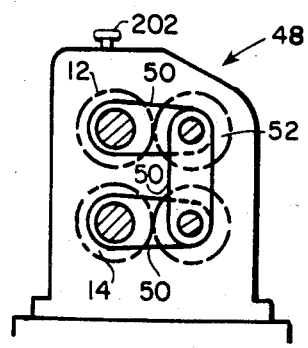
FIG. 4 is a schematic cross-sectional view showing the drive linkages for the prior art slitter of FIG. 1.

An elevational view of a prior art outboard housing 18 for a slitter 10 is illustrated in FIG. 3. Upper and lower apertures 44 and 46 respectively support bearings which are used to mount the upper and lower arbors 12 and 14. Details of the drive system 48 which are found as part of the inboard housing 20 are shown in FIG. 4. Upper and lower arbors 12 and 14 are driven by a series of links 50 and idlers 52 which connect through drive train elements 28, 30, and 32 to the motor 22.

The prior art slitter described in FIGS. 1 through 4 is typical of many in operation in the field. Slitters are available from a number of companies including, but not limited to, Loopco Industries, Inc. of Cleveland, Ohio and Paxson Machine Company of Salem, Ohio.

Figure 5:
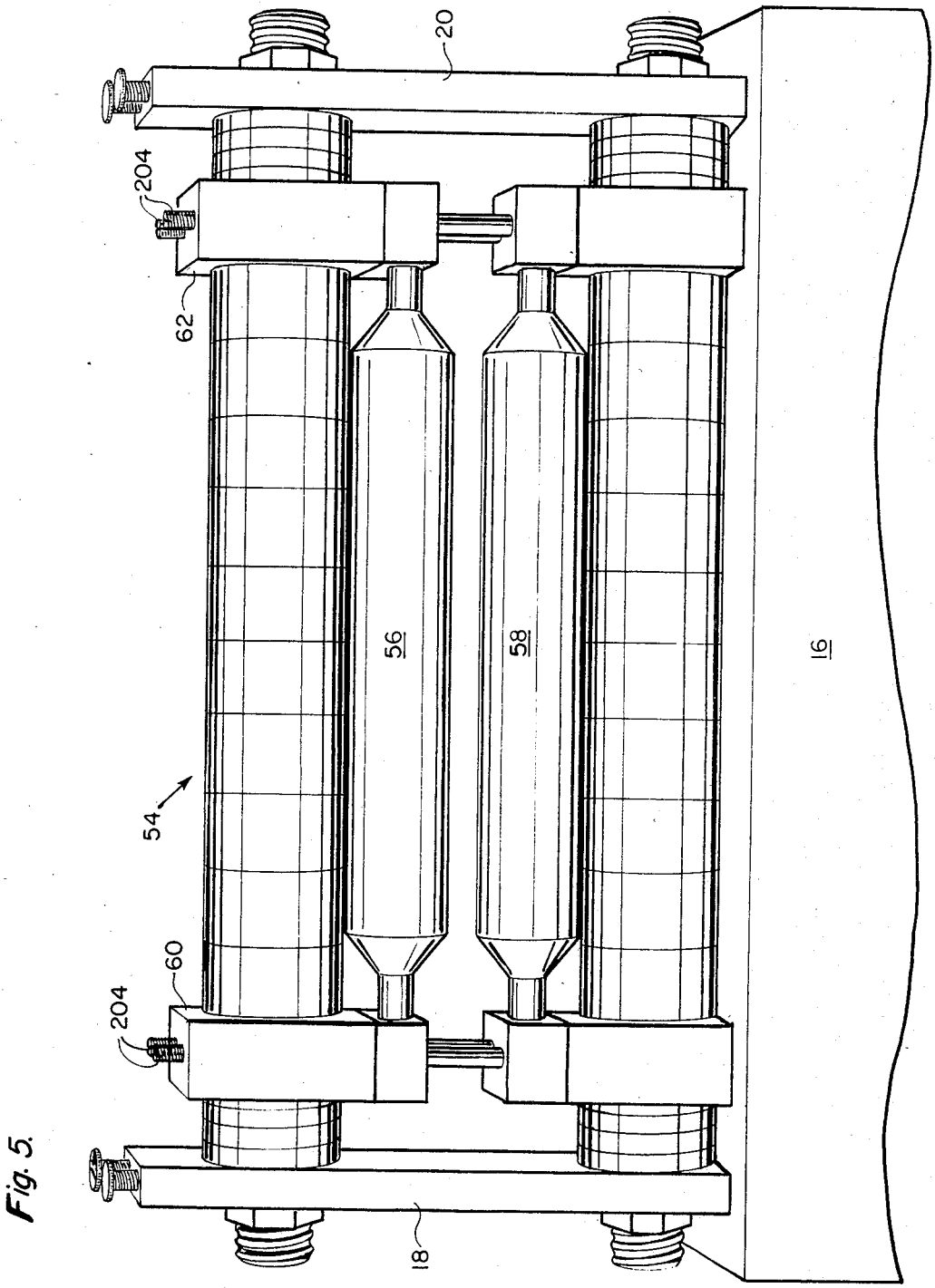
FIG. 5 is a front view of a converted slitter employed as a four-high cold reduction mill according to the preferred embodiment of the invention.
Figure 6:
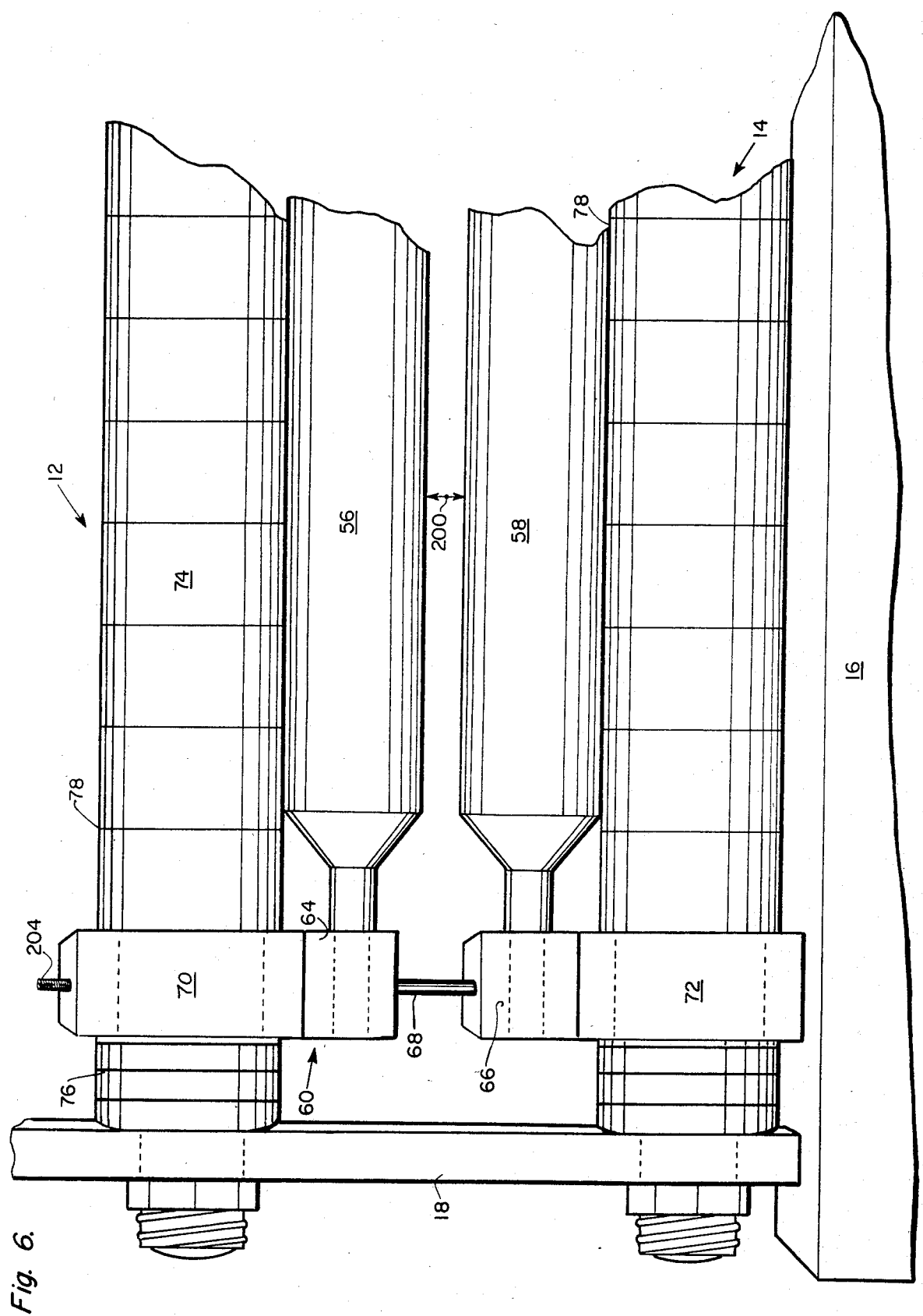
FIG. 6 is a detailed view of the housing mechanism for supporting the work rolls from the arbor shafts.

A converted arbor/four high cold reduction mill 54 according to the preferred embodiment of the invention is illustrated in FIG. 5. Details of that embodiment are found in FIGS. 6 through 11 and 13. The converted unit 54 includes an upper work roll 56 and a lower work roll 58 supported by left and right roll support units 60 and 62. FIG. 6 illustrates in detail the structure of the left roll support unit 60. Each roll support unit 60 and 62 includes an upper and a lower arbor race housing 70 and 72 and an upper and a lower floating work roll housing 64 and 66 connected together by a group of housing guide pins or rods 68. While two guide pins 68 are shown, it may be desirable to have four or more for added stability and strength. The upper and lower arbor race housings 70 and 72 each respectively fit over the upper and lower arbor shafts 74. Each arbor shaft 74 includes a key 76 and a packing sleeve 78. Accordingly, each arbor race housing 70 and 72 includes a bearing element 80 equipped with a key way 82 to engage the key 76 in arbor shaft 74. The upper ends 204 of rods 68 are threaded and have a slotted top. The threads 204 can receive a nut to keep the rods 68 from slipping out of housing 70.

Figure 7:
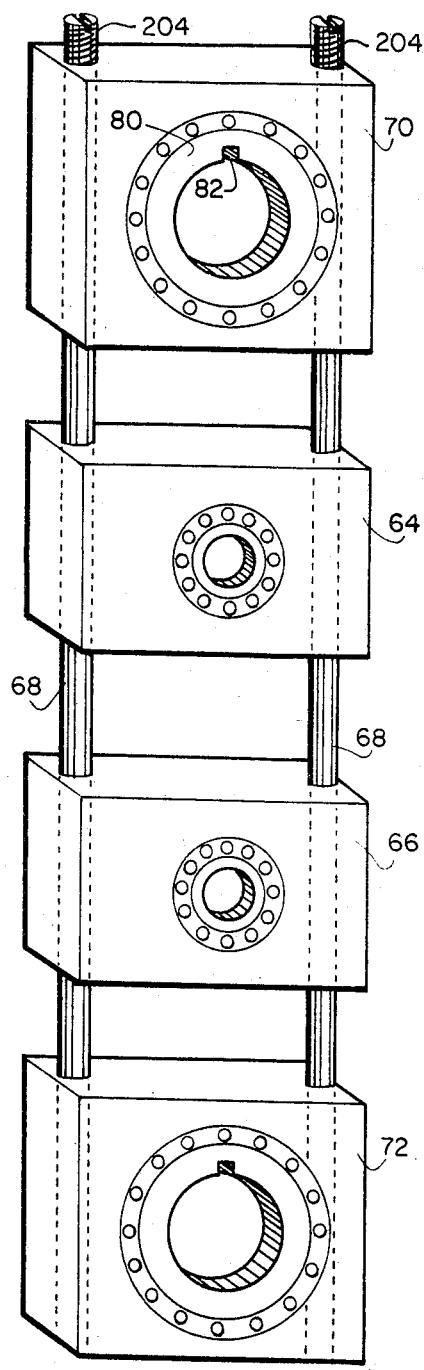
FIG. 7 is a side perspective view of the end housing support bearings for the arbor shafts and the work rolls.
Figure 8B:
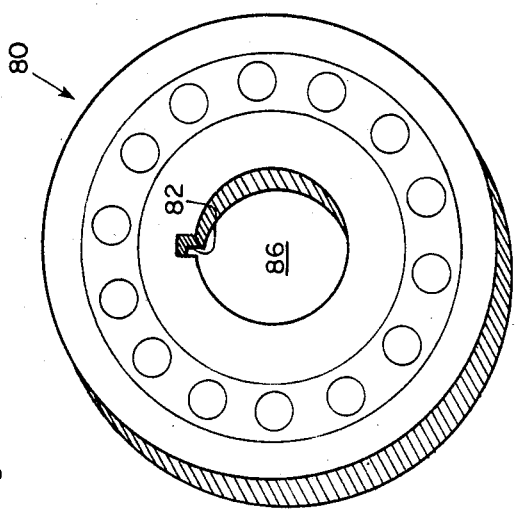
FIG. 8B is a detail side perspective view of the bearing and inner race that accomodates the arbor with a key.
Figure 9B:
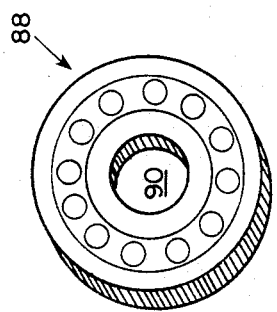
FIG. 9B is a detail side perspective view of the bearing and inner race for the work rolls.
Figure 8A:
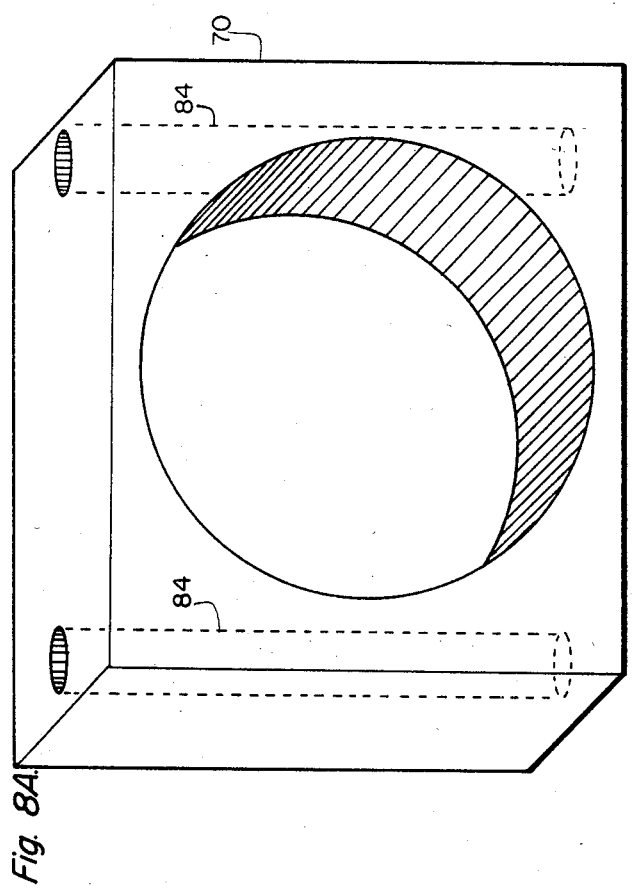
FIG. 8A is a detail side perspective view of the arbor shaft housing.
Figure 9A:
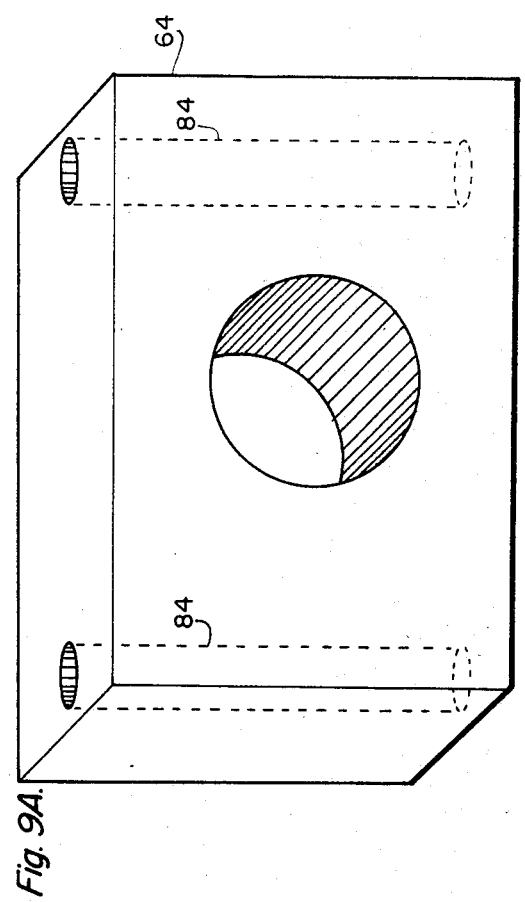
FIG. 9A is a detail side perspective view of the floating work roll housing.

FIGS. 7, 8A and 9A illustrate the presence of a guide pin shaft 84 which extends through the upper and lower work roll housing 64 and 66 and the upper and lower arbor race housing 70 and 72. Upper and lower work roll housings 64 and 66 generally float on guide pinds 68 between the upper and lower arbor race housing 70 and 72. When upper and lower work rolls 56 and 58 are mounted in work roll housing 64 and 66, they touch or "kiss" the upper and lower arbors 12 and 14. Accordingly, upper and lower arbors 12 and 14 act as back up rolls to work rolls 56 and 58 like they would in a conventional four high cold roll mill. A gap 200 is generally present between upper and lower work rolls 56 and 58. The gap 200 can be regulated by a screw down mechanism 202 which is incorporated as a standard part of the adjustment apparatus for spacing the upper and lower arbor rolls 12 and 14. Elements 202 indicate the presence of the screws on the inboard and outboard housings 20 and 18 respectively employed to change the gap 200 between upper and lower arbor rolls 12 and 14 respectively. Typically the lower arbor 14 is stationary and the upper arbor 12 is movable by screw drive 202. These conventional details do not require further description since they are already know to those of skill in the art.

Details of a typical arbor race housing 70 are illustrated in FIGS. 8A and 8B. The housing 70 includes an opening of sufficient size to comfortably and securely hold bearing 80. Bearing 80 includes key way 82 and aperture 86 which receives arbor shaft 74 of the upper arbor roll 12. FIGS. 9A and 9B illustrate the details of a typical work roll housing 64. The work roll housing 64 also includes an opening of sufficient size to securely hold work roll bearing 88. Work roll bearing 88 includes an aperture 90 of sufficient size to support one end of work roll 56 or 58. While FIGS. 8A and 8B are directed towards the upper arbor race housing 70 and the upper work roll housing 64, they could just as well be directed towards the lower arbor housing 72 or the lower work roll housing 66.

Figure 10B:
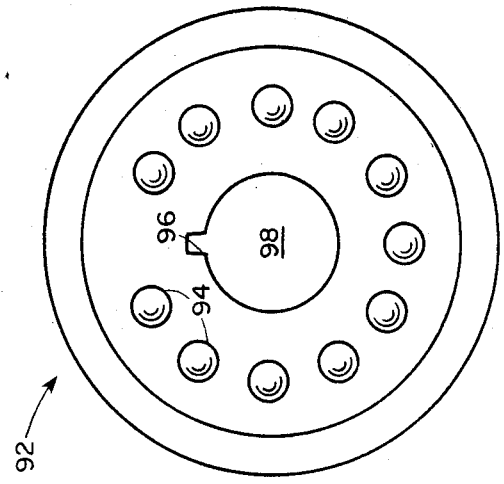
FIG. 10B is a side elevational view of the buffer packing illustrated in FIG. 10A.
Figure 10A:
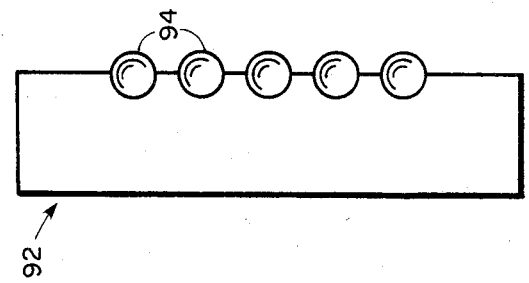
FIG. 10A is a front elevational view of the buffer packing located on the outside of the arbor housing.
Figure 11:
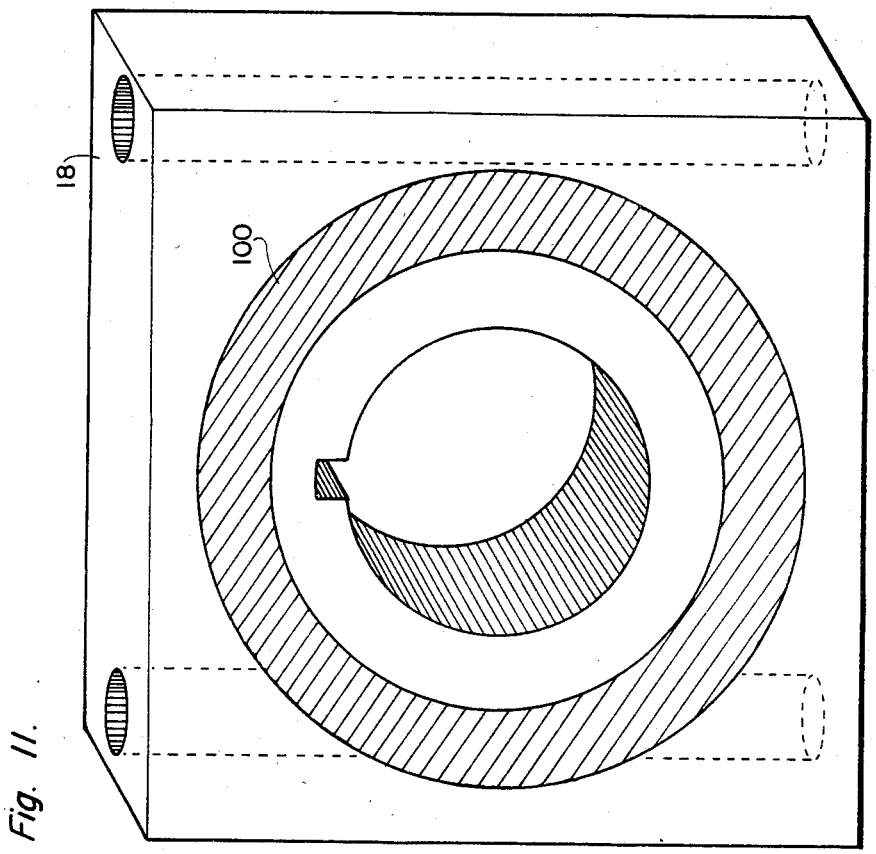
FIG. 11 is an elevational perspective view of the outside face of the arbor race housing.

FIGS. 10A and 10B are directed towards the buffer packing located on the outside of the arbor race housings 70 and 72. They contact the outerface of the arbor race housings 70 and 72 as illustrated in FIG. 11. Each buffer packing 92 includes a plurality of ball bearings 94 which ride in the arbor housing race track 100 illustrated in FIG. 11. Aperture 98 includes a key way 96 to receive the key 76 on arbor shaft 74.

The foregoing describe the elements necessary to convert a prior art slitter 10 into a four high cold reduction apparatus 54. The steps which are necessary to make the conversion are outlined below.

First, slitter blades 24 are removed from the prior art device 10.

Second, the arbors 12 and 14 are screwed apart a sufficient distance to allow room for the upper and lower work rolls 56 and 58.

Third, the right and left roll support units 60 and 62 are installed over the upper and lower arbors 12 and 14. At the same time various other arbors modification elements are installed including but not limited to, the buffer packing element 92, packing sleeves 78, etc.

Fourth, the upper and lower work rolls 56 and 58 are mounted so that their end shafts are received respectively in apertures 90 of the upper and lower work roll housings 64 and 66.

Fifth, and last, the gap 200 between the upper and lower work rolls 56 and 58 is adjusted by adjusting the spacing between the upper and lower arbors 12 and 14 by conventional screw mechanism 202. The machine 54 is now ready to perform as a four high cold reduction mill.

Figure 12:
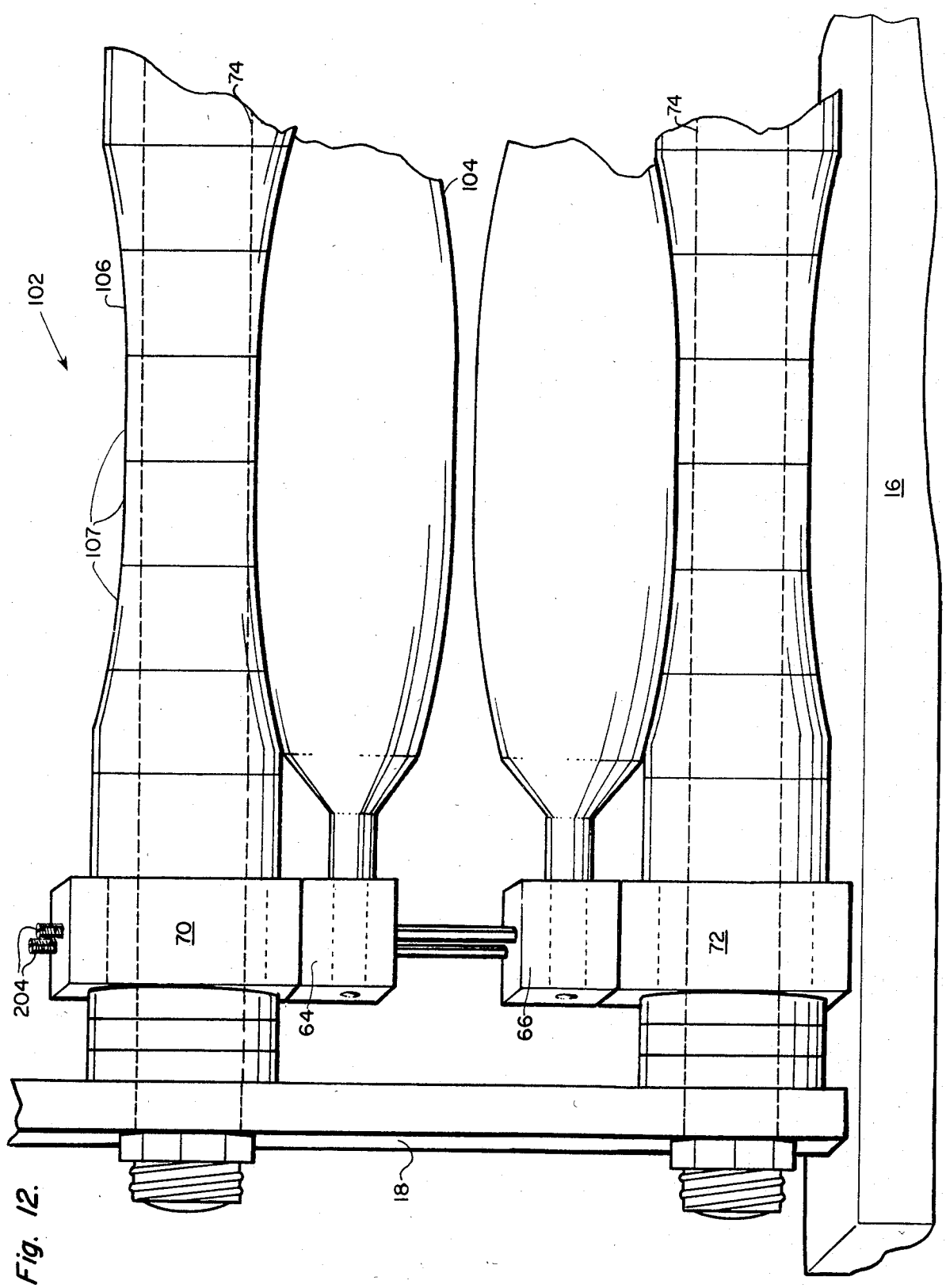
FIG. 12 is a perspective breakaway view of a converted slitter having a crowned work roll.

An alternative modification 102 to the preferred embodiment of the invention 54 is illustrated in FIG. 12. A crowned work roll 104 is employed in place of a straight cylindrical work roll 56. Likewise the lower work roll is also crowned. As a consequence the back up arbor 106 has a concave profile which is complimentary to the crown on work roll 104. The concave profile of arbors 106 is achieved by placing together a plurality of concavely contoured packing sleeves 107. The use of crowned work rolls is believed to be known in the prior art. The purpose of crowning the work roll is to provide uniform pressure along its length due to the natural tendency of the work roll to deflect upwards in the middle. The use of crowned work rolls and concave back up rolls in the context of a converted slitter 102 is believed to be entirely new and unique.

Figure 13:
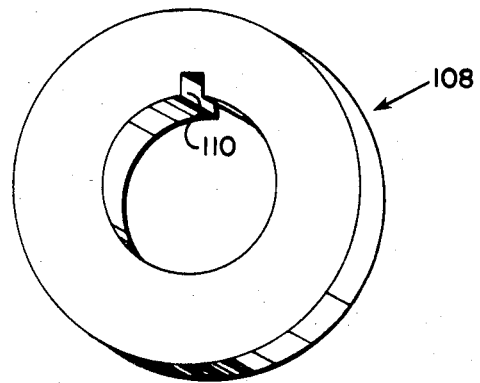
FIG. 13 is a front perspective elevational view of a self-lubricating shim.

Common to embodiments 54 and 102 is a self-lubricating mechanical plastic shim 108 as illustrated in FIG. 13. Shim 108 can be formed from Nylatron ® or similar material. The purpose of shim 108 is to absorb friction between the turning arbors including arbor packing elements 26 or 78 or 107 or the like and the stationary arbor race housings 70 and 72. Accordingly, Shim 108 includes a key way 110 adapted to receive the key 76 of a typical arbor shaft 74.

Figure 14:
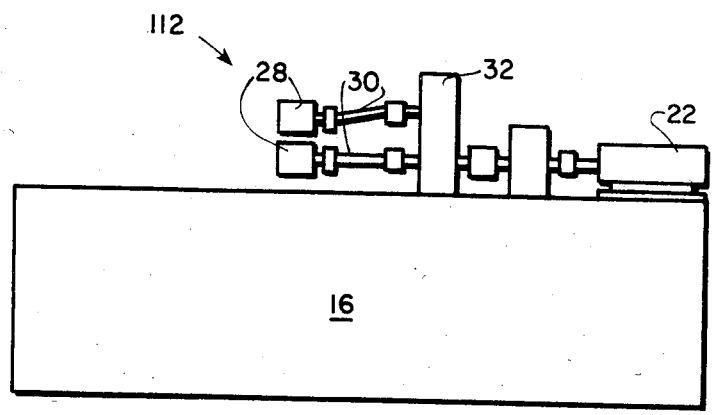
FIG. 14 is a front elevational view of the slitter unit of FIG. 1 with the slitting head removed.
Figure 15:
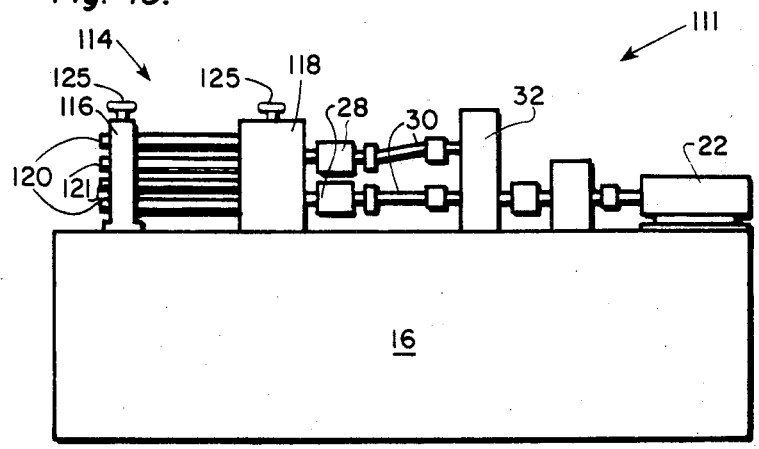
FIG. 15 is a front elevational view of the slitter unit of FIGS. 1 and 14 with the slitter head replaced with a four-high cold reduction mill head.

An alternative embodiment 111 of the invention is illustrated in FIG. 15. Embodiment 111 is achieved by removing the slitter head 34 from a prior art slitter 10 such as illustrated in FIG. 1. FIG. 14 illustrates the intermediate embodiment 112 in which the slitter head 34 has been removed from a prior art arbor slitter 10.

Figure 16:
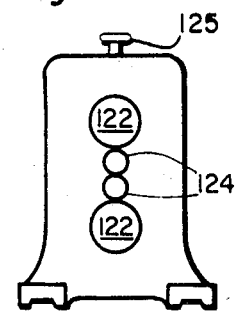
FIG. 16 is a side elevational view of the outside housing of the four-high cold roll mill of FIG. 15.
Figure 17:
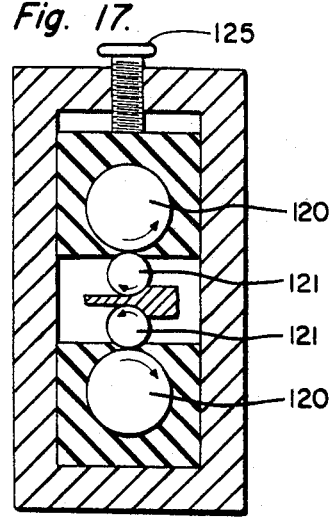
FIG. 17 is a cross-sectional view of the outside housing shown in FIG. 16.

The next step is the installation of a four high cold reduction head 114 where the prior art slitter head 34 was located. The new four high head 114 includes an outboard housing 116, an inboard housing 118, a pair of back up rolls 120 and a pair of work rolls 121. FIG. 16 is a side elevational view of the outboard housing 116 of four high cold reduction head 114. FIG. 17 is a detailed cross-sectional view of the outboard housing of FIG. 16. A pair of upper and lower apertures 122 are adapted to accomodate the upper and lower back up rolls 120. A pair of intermediate, or middle, apertures 124 are adapted to receive the end shafts of the two middle work rolls 121. Adjustments for pressure, spacing, etc. are accomplished by screw down elements 125 on replacement head 114 in the conventional manner. Accordingly, details of those features are not required for further understanding of the invention. Lastly, the prior art drive train consisting of drive motor 22 and elements 28, 30 and 32 is connected to a linkage system located within inboard housing 118 to drive the rolls 120 and 121 in the conventional manner.

The method and apparatus just described for converting a prior art slitter 10 into a four high cold reduction mill such as found in embodiments 54, 102 and 111 has several distinct advantages over the prior art.

First, there is a tremendous savings in capital costs because the steel converter operator only has to purchase one machine and a conversion kit rather than individual slitters and cold roll mills.

Second, the converted machines 54, 102 and 110 are very energy efficient. The typical prior art take-up unit 42 has an output of approximately 75 to 100 horse power. This compares to a typical conventional four high mill which might have a drive system which consumes hundreds of horse power. Therefore, the converted embodiments 54, 102 and 111 use much less energy. Since they use much less energy, they are only capable of relatively small reductions (in the range of 8% or less). Nevertheless, it is believed that there is a significant market for "skin-pass" or small cold roll reductions. It is believed that the invention, therefore, meets a special need and will help to make the steel processing industry more competitive.

The invention just described is disclosed in the context of plain steel slitting and cold rolling. Other types of metal working are also possible. For example, the work rolls can be patterned so as to give the steel a grainy finish. Alternatively, other metals, such as aluminum can be reduced to relatively small thicknesses. For example, a patterned aluminum foil could be produced on this invention.

While the invention has been described with reference to a preferred embodiment thereof, it will be appreciated by those of ordinary skill in the art that various modifications can be made to the invention and the various elements thereof without departing from the spirit and scope of the underlying idea.

I claim:

1. A method for converting a sheet metal slitting machine having a base, a drive motor means, and a slitter head including a pair of slitter arbors and an inboard and an outboard housing for supporting said slitter arbors into a four-high cold reduction mill, comprising the steps of:

disconnecting said drive means from said slitter head;

removing said slitter head from said base;

installing a four-high cold reduction head including an inboard and an outboard housing and four rolls mounted in between said inboard and outboard housing; and, connecting said drive means to said four-high cold reduction head.

2. A method for converting a sheet steel slitting machine having a base, drive motor means, and inboard and outboard housing for supporting said slitter arbors into a cold reduction mill, comprising the steps of:

disconnecting said drive motor means from said slitter head;

removing said slitter head from said base;

installing a cold reduction head means including an inboard and an outboard housing and roll means mounted in between said inboard and outboard housing; and, connecting said drive motor means to said cold reduction head means.

* * * * *